Oct. 21, 1924.
M. SMITHEY
METER
Original Filed Jan. 3, 1917   2 Sheets-Sheet 1
1,512,144
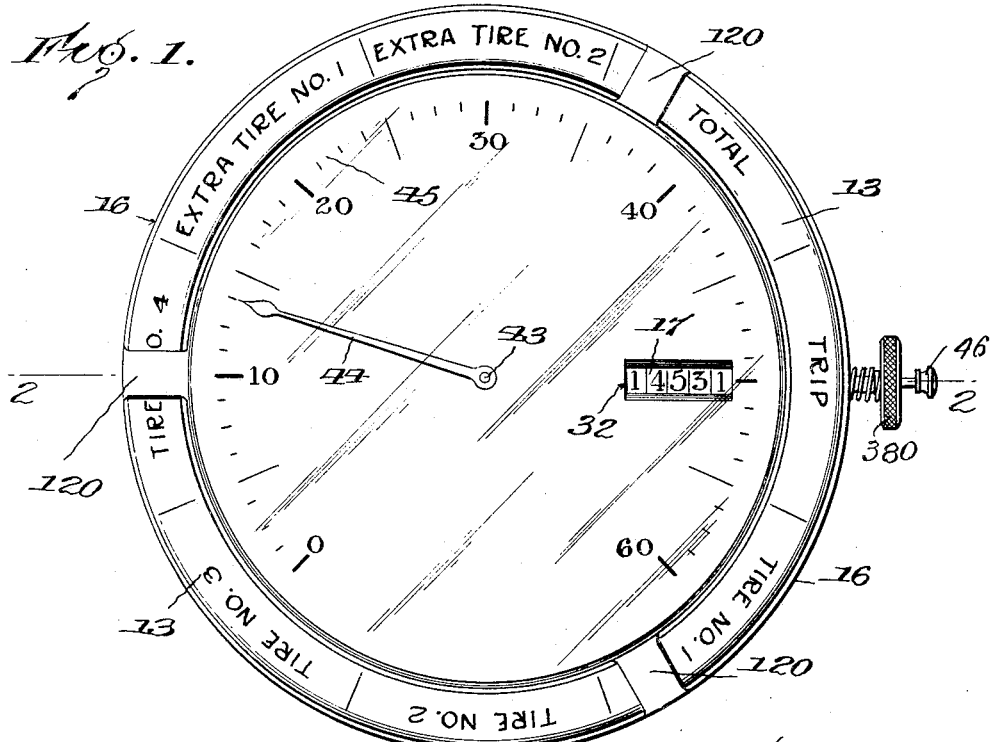
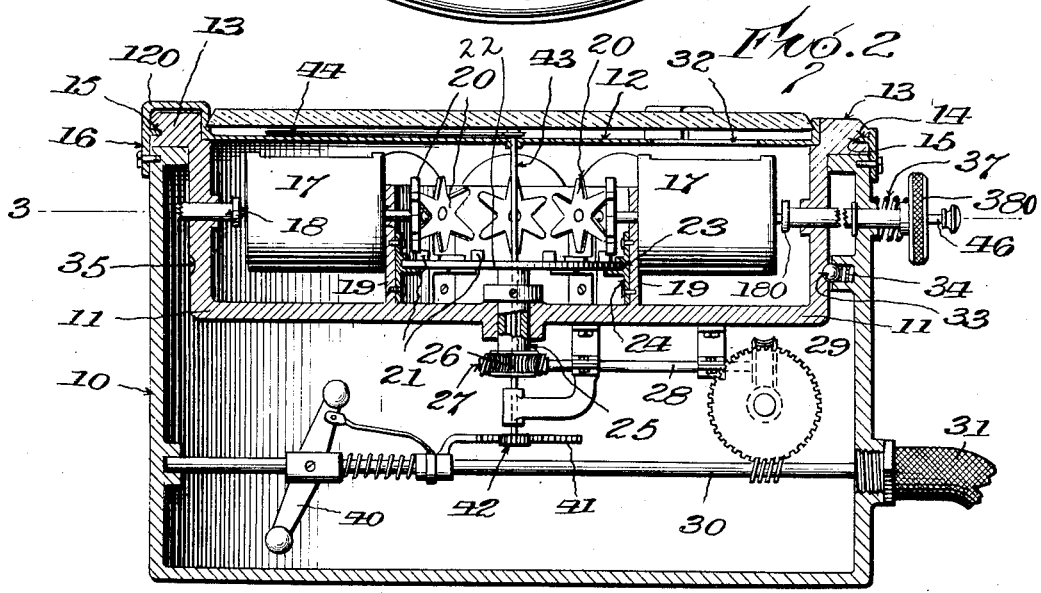
Inventor
Marvin Smithey,
By Chas. J. Williamson,
Attorney Oct. 21, 1924.                                              1,512,144
M. SMITHEY
METER
Original Filed Jan. 3, 1917      2 Sheets—Sheet 2
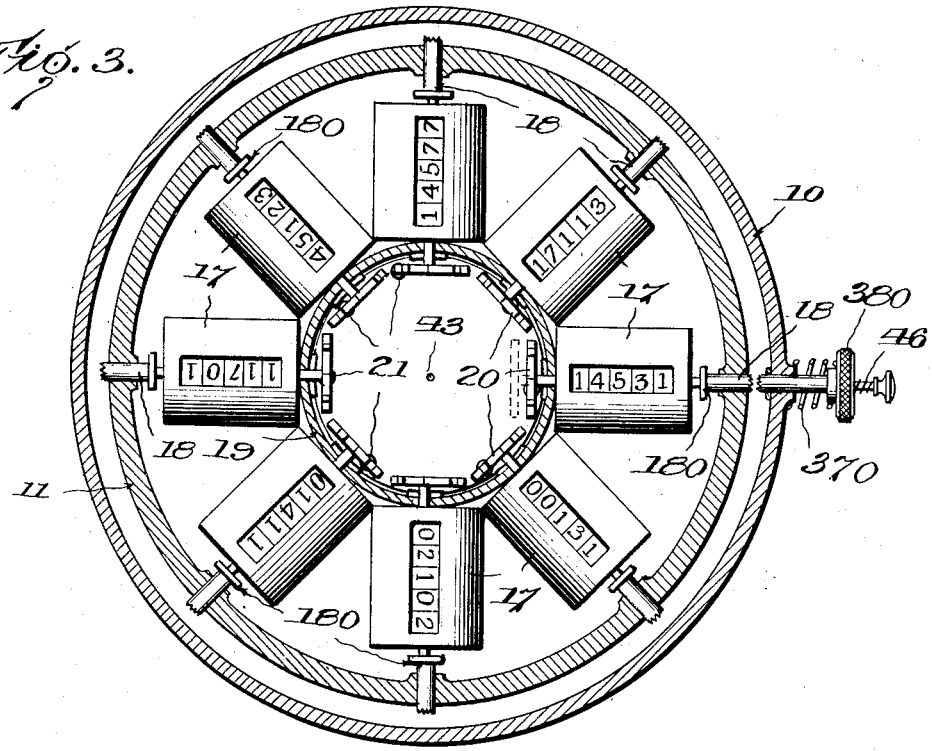
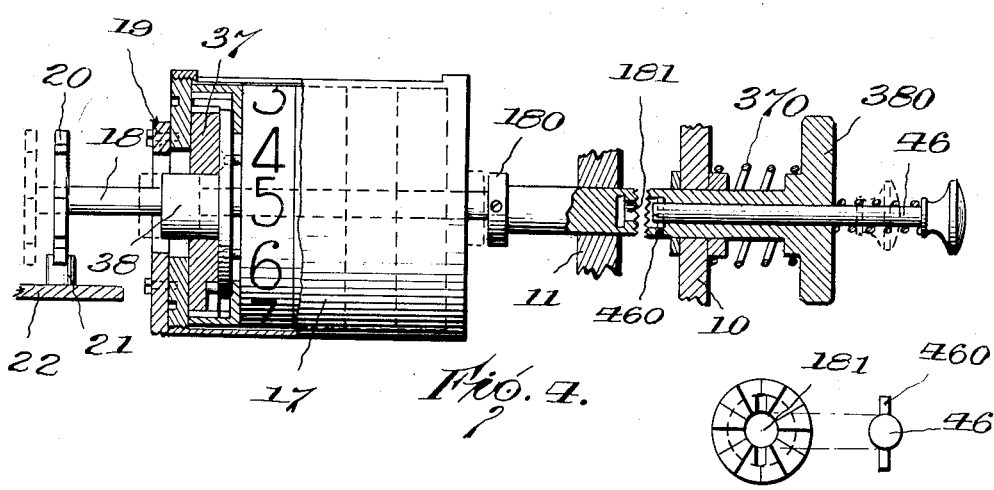
Inventor
Marvin Smithey,
By Chas. J. Williamson
Attorney Patented Oct. 21, 1924.

1,512,144

UNITED STATES PATENT OFFICE.

MARVIN SMITHEY, OF LAWRENCEVILLE, VIRGINIA.

METER.

Application filed January 3, 1917, Serial No. 140,385. Renewed January 7, 1924.

*To all whom it may concern:*

Be it known that I, MARVIN SMITHEY, a citizen of the United States, and resident of Lawrenceville, in the county of Brunswick and in the State of Virginia, have invented a certain new and useful Improvement in Meters; and do hereby declare that the following is a full, clear, and exact description thereof.

In making my invention I have had particularly in view the production of a device, or instrument especially applicable to automobiles, and I will, therefore, consider and explain my invention having in mind that particular relation. My object, generally stated, is to provide in a single instrument a plurality of indicating, or registering means whose indications are directly related to and based upon the distance traveled, and which are so organized that while capable independently of one another to perform their own exclusive functions, are, nevertheless, actuated by power transmitted through a single member which may be the well known flexible shaft that receives its motion from one of the wheels of the vehicle, and to accomplish all this by mechanism that will be as simple as possible, out of consideration for cost of manufacture, the diminution or elimination of liability to derangement, or maladjustment of parts which would render the device inaccurate, or inoperative, and the securing of compactness and lightness, and to this end my invention consists in the meter having the characteristics of construction substantially as hereinafter specified and claimed.

In the accompanying drawings—

Fig. 1 is a front view of an instrument embodying my invention;

Fig. 2 is a section on the line 2—2 of Fig. 1;

Fig. 3 is a horizontal section on the line 3—3 of Fig. 2.

Fig. 4 is a detail view, partly in side elevation and partly in section of one of the odometers;

Fig. 5 is a detail view in end elevation of the cooperating members of the zero resetting device.

The moving members, or elements of the mechanism embodying my invention are mounted upon and housed by a casing 10 having a cylindrical form, one end of said casing being closed by a preferably integral back, and the opposite, or outer, or front end containing and being closed by a supplemental cylindrical frame 11, having its inner end closed by a bottom plate which may be integral with the side walls, and its outer end closed by a circular glass covered dial, or face plate 12, that is stationarily supported from the main casing, as by fingers 120.

The supplemental frame 11 is rotatably mounted in the main casing 10 for a reason hereinafter set forth, and it may be so mounted by an annular flange and groove connection, which, while securely holding the two casing members together will, nevertheless, allow free turning of the supplemental casing, as by the application of the fingers to a marginal, outwardly projecting annular rim, or flange 13, which projects outwardly and overhangs the adjacent edge of the side wall of the casing 10, and in the outer side of which may be formed, or provided an annular groove 14, which receives the inturned flange 15 of a ring 16 secured by screws to the outer side of the main casing 10, and made in sections for the convenient assembling of the parts, said groove 14 and flange 15 providing the groove and flange connection just referred to to enable the rotatable mounting of the supplemental casing 11.

Mounted within, and carried by the supplemental casing, or frame 11, is a plurality of counting devices, or registers 17, which as shown, are of the type consisting of a series of side by side disks that bear numerals on their peripheries and mounted on and carried by a driving shaft 18 which is arranged radially. As shown, there are eight such registers, or indicators and they are arranged in a circular series equal distances apart around the center, or axis of the cylindrical casing, that is to say, about a common center. The support of the shafts 18 at their outer ends may be provided by the circular wall of the supplemental casing 11, while at their inner ends each may be supported by a bracket, or bearing plate 19 rising from the bottom of the supplemental casing 11. At the inner end of each register operating shaft 18, is a star wheel 20, and each star wheel in turn is adapted to be engaged and rotated through the space of one tooth at a time by each of a series of tappet studs, or teeth 21 projecting from the face of a circular plate, or disk 22, which at its edge is supported to turn freely between the lips, or flanges of circularly alining grooves 23 in a series of lugs 24 secured to the bearing brackets 19 on their inner side. There may be one tappet tooth 21 for each of the registers 17, in which case by the revolution of the tappet carrier 22 all of the registers will be simultaneously actuated, but as the simultaneous actuating of all the registers is difficult, or cannot be satisfactorily done without making the parts unduly heavy, thus increasing the cost and bulk of the mechanism, I provide a number of tappet teeth one less than the number of registers 17, so that only one register at a time will be actuated, the tappet teeth thus coming into action successively, or one after another on the registers, so that the burden on the actuating devices is simply that of moving one register at a time.

The tappet carrier 22 is secured to and is rotated by a shaft 25, which is concentric with the circular series of registers. or with the center from which their axes of rotation radiate and, of course, is concentric with the supplemental casing 11 so that the latter may be freely rotated about said shaft 25 and outside said supplemental casing 11 and within the main casing 10 said shaft 25 has a worm wheel 26 meshing with a worm 27 on a shaft 28 extending crosswise of the casing 10, and which by suitable gearing, generally designated by the numeral 29, and which may be worm gearing, is operatively connected with the main driving shaft 30 that extends diametrically across the main casing 10, and at one end is formed for connection with the customary flexible shaft 31, by which power connection is had with one of the automobile wheels.

The various registers 17, are, respectively, assigned to making a distance, or mileage record, such as trip mileage, total mileage and the mileage of the various tires, both the four in use and the spare, or extra tires, and on the manually engageable rim 13, there are designations of the tires, or the things in relation to which the registers work, such designation being in a fixed position in relation to the respective registers 17. Thus, as shown in the drawings, said operating rim 13 is marked off into eight equal divisions, and in one division there is the word "Total" in another the word "Trip" in another "Tire No. 1" and so on. In the dial there is a single slot 32 of a length and width to expose a whole line of numerals on the periphery of a register 17 and, of course, it extends in the direction of its length radially of the instrument, or parallel with the axis of rotation of the counting disks of a register when in alinement with the slot. It will, therefore, be seen that by the revolution of the supplemental casing 11 any one of the registers 17 at a time may be brought into position opposite said slot and thus in reading position, and thus to know what the reading of a particular register is it is necessary merely to rotate the supplemental casing 11 until the designation of that particular register is opposite the slot 32, which thus by cooperation with the indication on the rim 13 performs the function of an index. To assure the accurate setting of a line of numerals of a register in coincidence with the reading slot 32, a suitable yielding stop device is employed which may be a ball 33 mounted in a seat, or cavity in the inner side of the main casing 10 in position to be pressed by a spring 34 into any one of a series of spherical cavities, or sockets 35 spaced equal distances apart in the outer face of the side wall of the supplemental frame, or casing 11. Thus when the supplemental frame casing 11 has been rotated to place in accurate alinement the numerals and reading slot, the ball will be yieldingly seated in the notch, or cavity, that at such time is brought opposite it, and hence, accidental displacement of register from the reading opening avoided.

It is desirable to be able, whenever desired, to disconnect any one of the registers from its operating devices. This I accomplish in the embodiment of my invention shown by making the register driving shaft 18 longitudinally movable so as to shift the star wheel 20 out of the path of the tappet teeth 21. A single operating device may be employed adapted to work with each register shaft 18 for that purpose, when by rotating the supplemental casing 11 the shaft is brought into a position for operation by said device. Said device may be in the form of a longitudinally slidable rod 46 extending to the outside of the casing 10, where it has a head by which it may be grasped for manipulation, both for longitudinal movement and for turning, the turning movement may be provided to connect and disconnect with the shaft 18, and the longitudinal movement being utilized to move the shaft 18 longitudinally to place its star wheel into, or out of operative relation with the tappet teeth 21. Normally, of course, there is no connection between the rod 46 and any one of the shafts 18, so that there may be no obstruction to the free turning of the series of registers to substitute one for another at the display opening 32. The type of register shown is the well known one wherein the power from the driving shaft 18 is transmitted to the units disk of the series by a gear wheel 37, which is mounted upon an eccentric 38 on the shaft 18 and said eccentric has such length that all times in the longitudinal movement of the shaft 18 it is in operative engagement with said gear wheel. By reference to Fig. 4, which shows the normal position of the parts, it will be seen that by thrusting the rod 46 inward its inner end will strike the adjacent end of the shaft 18 and the latter thus may be pushed to place the star wheel in the position shown in dotted lines. A collar 180 on the shaft 18 limits the endwise movement of the shaft 18 when the star wheel is thus pushed from operative to inoperative position. In the end of said shaft 18 adjacent the inner end of the push rod 46, there is a hole 181, which at its inner end is enlarged, as shown, so that radial lugs 460 on diametrically opposite sides of rod 46, by the inward movement of said rod 46, may pass through diametrically opposite slots leading into the enlargement of said opening 181, and by a partial turn of the rod 46 made to engage the outer wall of said enlargement adjacent said slots so that upon pulling the rod 46 outward the shaft 18 may be moved longitudinally outward to place its star wheel again in position for engagement with the tappet teeth. The eccentric 38 on the shaft 18 serves as a stop to limit this outward movement of the shaft 18 and its star wheel. The rod 46 is disengaged from the shaft 18 by a reverse operation from that just described to couple them together.

A zero setting device 380 is employed which consists of a short shaft with a turning head, the shaft being mounted slidably in the side wall of the casing 19 with an inner end shaped, or formed with clutch teeth, or a clutch face adapted to intermesh with a corresponding face on the outer end of each of the shafts 18, when by the revolution of the supplemental casing 11, the shaft 18 is in alinement with the shaft of said zero setting device 38. A spring 370 normally holds the zero setting device in position out of engagement with the register shaft.

The instrument is provided with a centrifugal speedometer of ordinary construction, the centrifugal ring 40 being mounted upon the main driving shaft 30, and motion being transmitted from it by means of a rack 41 meshing with a pinion 42 on the end of a spindle, or arbor 43 which passes through the centrally located shaft 25, and said spindle 43 having on its outer end a hand, or index 44 that vibrates over a graduated arc, or scale 45 on the dial, or meter face.

Having thus described my invention what I claim is—

1. The combination of a casing, a plurality of separate registers mounted in said casing, each register having its own device for receiving power to actuate the register and a single rotating power communicating member for actuating all said devices with reference to which said registers are concentrically arranged with their indicating devices extending in radial lines, said casing having a common point for the display of the register indications which they may be brought one at a time.

2. In an odometer mechanism for use with automobiles, the combination of a plurality of separate registers arranged in a circular series from the center of which the several registers radiate, said registers lying in the same plane, and the numerals of different denomination extending when in reading position in radial lines, a rotating driving member with which normally all said registers are in operative relation, said driving member receiving its motion from a rotating member of the automobile, a casing having a face plate lying parallel with the plane of said registers and having a display opening, and a rotatable support for said registers for bringing them in succession opposite said display opening.

3. In an odometer mechanism for use with automobiles, the combination of a plurality of separate registers arranged in a circular series from the center of which the several registers radiate, said registers lying in the same plane and the numerals of different denomination extending when in reading position in radial lines, means to actuate said registers comprising two elements normally in cooperative relation, one being a toothed wheel connected with each register and the other a rotating driving member having a series of tappet teeth less in number than the number of toothed wheels and arranged to act dissimultaneously on the latter, said driving member receiving its motion from a rotating member of the automobile.

In testimony that I claim the foregoing I have hereunto set my hand.

MARVIN SMITHEY.